US008563055B2

(12) United States Patent
Gertzell

(10) Patent No.: US 8,563,055 B2
(45) Date of Patent: Oct. 22, 2013

(54) ENSILING AGENT

(75) Inventor: Bengt Gertzell, Everöd (SE)

(73) Assignee: Hanson & Mohring, Halmstad (SE)

( * ) Notice: Subject to any disclaimer, the term of this patent is extended or adjusted under 35 U.S.C. 154(b) by 388 days.

(21) Appl. No.: 12/733,374

(22) PCT Filed: Sep. 10, 2008

(86) PCT No.: PCT/EP2008/061965
§ 371 (c)(1),
(2), (4) Date: May 20, 2010

(87) PCT Pub. No.: WO2009/034091
PCT Pub. Date: Mar. 19, 2009

(65) Prior Publication Data
US 2010/0278968 A1 Nov. 4, 2010

(30) Foreign Application Priority Data

Sep. 10, 2007 (SE) ...................................... 0702010

(51) Int. Cl.
*A23K 3/03* (2006.01)
(52) U.S. Cl.
USPC .............................. 426/9; 426/335; 426/807
(58) Field of Classification Search
USPC .............................................. 426/9, 335, 807
See application file for complete search history.

(56) References Cited

U.S. PATENT DOCUMENTS

| 2,160,167 | A | * | 5/1939 | Pfeiffer | 426/321 |
| 2,731,348 | A | * | 1/1956 | Striegel et al. | 426/654 |
| 4,073,889 | A | | 2/1978 | Beck et al. | |
| 4,088,789 | A | | 5/1978 | Beck et al. | |
| 5,906,849 | A | * | 5/1999 | Reuter et al. | 426/335 |
| 2004/0052906 | A1 | | 3/2004 | Hernandez et al. | |

FOREIGN PATENT DOCUMENTS

| DE | 4112866 | | 10/1992 |
| DE | 10236797 | | 2/2004 |
| GB | 1076913 | A * | 7/1967 |
| GB | 2095534 | A * | 10/1982 |
| WO | WO 9316611 | A1 * | 9/1993 |

OTHER PUBLICATIONS

Saarisalo et al. Agricultural and Food Science, vol. 15, pp. 185-199, 2006.*
Weinberg Z.G. et al., "The effect of applying lactic acid bacteria at ensiling on the aerobic stability of silages", *J. Applied Bacteriol*,. vol. 75, pp. 512-518, (1993).
Peter McDonald et al., "The biochemistry of Silage", *Chalcombe Publications*, 13 Highwoods Drive, Marlow Bottom, Marlow Bucks, UK, pp. 103-105, 108-129, 184-185 and 199-207 (1991).
Pahlow G, et al., "Microbiology of Ensiling", *Silage Sci. Tech.*, Agronomy monograph 42, pp. 43 and 46-48 (2003).
Spoelstra S.F. "Degradation of nitrate by Enterobacteria during silage fermentation of grass". *Netherlands J. Agri. Sci.* vol. 35, pp. 43-54 (1987).
Jonsson A "The Role of Yeast and Clostridia in Silage Deterioration". *Swed. Univ. Agric. Sci.*, Dept. of Microbiology, Doctoral Thesis, Report 42, Uppsala, Sweden; (1989).
Rammer C "Manure in Grass Silage Production. Effects on silage fermentation and its hygienic quality", *Swed. Univ. Agric. Sci.*, Dept. of Animal Nutrition & management, Doctoral Thesis, Agraria 2, Uppsala, Sweden) (1996).
Rammer C., "Quality of grass silage infected with spores of *Clostridium tyrobutyricum*", *Grass and Forage Science*. vol. 51, pp. 88-95, (1996).
Bremner J.M. et al., "A simple method for determination of ammonium in semi-micro Kjeldahl analysis of soils and plant materials using a block digester". *Comm. Soil Sci.* Plant Anal. vol. 14: No. 10, pp. 905-913 (1983).
Andersson Rolf et al., "HPLC Analysis of Organic Acids in Lactic Acid Fermented Vegetables", *Z. Lebensm. Unters Forsch.*, vol. 176, pp. 440-443 (1983).
Lingvall et al., Influence of hexamine and sodiumnitrite in combination with sodium benzoate and sodium propionate on fermentation and hygienic quality of wilted and long cut grass silage, *J. Sci. Food Agric.* vol. 79: pp. 257-264 (1999).
Martin Knicky et al., "Sodium benzoate, potassium sorbate and sodium nitrite as silage additives", *J. Si. Food Agric.* vol. 89, pp. 2659-2667 (2009).
Anders Jonson, "Enumeration and confirmation of *Clostridium tyrobutyricum* in Silages using neutral red, D-Cycloserine, and lactate Dehydrogenase activity" *J. Dairy Sci.* vol. 73, No. 3, pp. 719-725 (1990).
Office Action dated Oct. 29, 2010 issued in corresponding European Application No. 08803932.6.
Larsson et al., *Determination of Readily Available Carbohydrates in Plant Material*, Swedish National Laboratory for Agricultural Chemistry, No. 22, p. 1-9, May 16, 1983 (with English-language translation).
Pahlow G., *Testing of the Level of Epiphytic Lactobacilii in Silage*, Institute of Grassland and Forage Crop Research, p. 6, Mar. 1990 (with English-language translation).
"Mold Inhibition on Unseasoned Southern Pine", Carol A. Clausen,The International Research Group on Wood Preservation, Paper Prepared for the 34th Annual Meeting, May 2003.
"Microbiological Screening of Food Preservatives, Cold Sterilants and Specific Antimicrobial Agents as as Potential Silage Additives" Michael K. Woolford, Journal of the Science of Food and Agriculture, vol. 26, No. 2, 1975, pp. 229-237.

* cited by examiner

*Primary Examiner* — Chhaya Sayala
(74) *Attorney, Agent, or Firm* — Harness, Dickey & Pierce, P.L.C.

(57) ABSTRACT

The present invention relates to an ensiling agent for forage, as well as a method for ensiling forage by adding said ensiling agent to forage.

24 Claims, No Drawings

US 8,563,055 B2

ENSILING AGENT

TECHNICAL FIELD OF THE INVENTION

The present invention relates to the field of agriculture and more specifically to an ensiling agent for forage, as well as to a method for ensiling forage and use of said ensiling agent.

BACKGROUND OF THE INVENTION

Forage can be stored either dried as hay or wet as silage. Silage is dominating because of the large dependency on the weather at hay-making. Silage is usually stored in either bales covered with plastic or in trench or tower silos. Silage is achieved by lactic acid creating bacteria, which are growing when the forage is stored air-tight and thus pH is decreased. Air-tightness and low pH prevents harmful bacteria, yeasts and moulds from destroying the forage. To help the process several additives for silage are present on the market. These additives are either lactic acid creating bacteria that compete with other microorganisms or chemicals that favour the growth of lactic acid creating bacteria and inhibit other microorganisms.

It is known that in order to make silage from forage plants that cannot be ensiled without difficulties, e.g. most green protein rich fodders or rain destroyed forage, it may be necessary to use controlling additive to prevent improper fermentation. The improved effect of ensiling agents results from a promotion of natural acidification. The thereby achieved drop in pH in the forage prevents the growth of harmful bacteria, yeast and mould, which can destroy forage by degradation. A family of bacteria being responsible for undesirable degradation of forage nutrients such as sugars and proteins is Clostridia. The predominant *Clostridium* species is *Clostridium tyrobutyricum*, but also other *Clostridium* species may be present in forage or silage. Furthermore, the quality of the forage is of great importance for animal health since forage of low quality has a negative impact on the animals immune defense and make them more susceptible for infections. The use of ensiling agents also affect products coming from the animals, such as milk and other dairy products. Thus ensiling agents of the highest possible quality is preferred. By using ensiling agents on forage increased storage stability, as well as an increased stability of the opened forage, may be achieved.

Ensiling agents comprising chemical compounds favour the development and growth of lactic acid producing bacteria and inhibit other microorganisms. An ensiling agent available on the market is Promyr NF that is marketed by Perstorp Speciality Chemicals AB. Promyr NF is an acidic composition containing formic acid and propionic acid and salts of organic acids, such as sodium formiate. Due to its acidity Promyr NF lowers the pH of the forage rapidly. Promyr NF has low stability when the forage is exposed to air, which implies that the forage is degraded upon opening. Thereby, forage of lower quality may be given to the animals. This low stability upon opening is especially valid for forages having a high DM and typically for forages with a DM of 40-60%. In addition, Promyr NF is corrosive and therefore to a large extent damages the equipment and machines that are in contact with the ensilage. Promyr NF only relies on its low pH as a protection against Clostridia, there are no additional components which hinders the growth of Clostridia. Upon opening of the silage Promyr NF does not confer any additional protection against fungus and mould. Another known ensiling agent is marketed as Kofasil Ultra and it is produced by ADDCON GROUP GmbH. Kofasil Ultra contains sodium benzoate, sodium nitrite, hexamine (hexamethylenetetramine) and sodium propionate. Lingvall and Lättemäe (Lingvall P & Lättemäe P (1999) Journal of the Science of Food and Agriculture. 79: p. 257-264) disclose different silage additives comprising hexamine, sodium nitrite, sodium benzoate and sodium propionate in different combinations, and Kofasil Ultra is disclosed but not referred to by name. A problem with Kofasil Ultra is that it contains hexamine, which may lead to toxic degradation products. The effect of hexamine is assumed to arise from the fact that formaldehyde is split off during the fermentation period. Hexamine may give rise to allergic reactions and therefore Kofasil Ultra is marked as having a potential allergic effect. Besides possible toxic side effects a disadvantage with hexamine is decomposition during the fermentation process, especially in the maturing phase of fermentation (U.S. Pat. No. 4,088,789). Although the concentration of hexamine could be decreased when being used in combination with benzoates in ensiling agents (U.S. Pat. No. 4,088,789) the problems of possible toxicity and its degradation to formaldehyde still remain. Another disadvantage is the rather high sodium nitrite concentration in Kofasil Ultra, which may be toxic for animals. One additional disadvantage is that Kofasil Ultra requires a 4 week waiting period before using the silage.

SUMMARY OF THE INVENTION

An object of the present invention is to provide an alternative ensiling agent to previously known ensiling agents for forage. This and further objects are achieved by an ensiling agent comprising sodium nitrite, sodium benzoate and potassium sorbate.

An object of the present invention is to provide an alternative method for ensiling forage. This object is achieved by a method comprising adding an ensiling agent comprising sodium nitrite, sodium benzoate and potassium sorbate to forage to be ensiled or to silage during ensilage.

DETAILED DESCRIPTION OF THE INVENTION

The present invention provides an ensiling agent for forage comprising sodium nitrite, sodium benzoate and potassium sorbate.

In one embodiment of the present invention the ensiling agent comprises one or more additional component(s).

In one embodiment of the present invention the ensiling agent comprises sodium nitrite in an amount from 1 to 10% by weight, such as from 2 to 8% by weight, such as from 3 to 7% by weight, such as from 4 to 6% by weight, such as about 5% by weight.

In one embodiment of the present invention the ensiling agent comprises sodium benzoate in an amount from 5 to 50% by weight, such as from 10 to 30% by weight, such as from 15 to 25% by weight, such as from 18 to 22% by weight, such as about 20% by weight.

In one embodiment of the present invention the ensiling agent comprises potassium sorbate in an amount from 5 to 35% by weight, such as from 5 to 25% by weight, such as from 7 to 15% by weight, such as from 8 to 12% by weight, such as about 10% by weight.

In one embodiment of the present invention the ensiling agent comprises sodium nitrite in an amount of 5% by weight, sodium benzoate in an amount of 20% by weight and potassium sorbate in an amount of 10% by weight. Herein this embodiment is referred to as A5.

In one embodiment of the present invention one or more additional additive or component may be added to the ensiling agent. Examples of such components are propionic acid, formic acid or any acceptable salt thereof or any mixture thereof.

In one embodiment of the present invention the forage is selected from clover, grass, lucerne, cereals, maize or any combination or mixture thereof.

One embodiment of the present invention relates to a method for ensiling forage comprising adding the ensiling agent above to said forage to be ensiled or to silage during ensilage. Preferably the ensiling agent is added to forage to be ensiled.

One embodiment of the present invention relates to a method for ensiling forage, wherein the ensiling agent is added to said forage before sealing the ensilage process.

One embodiment of the present invention relates to a method for ensiling forage, wherein up to 30 l ensiling agent is added per ton fresh forage, such as from 1 to 20 l ensiling agent, such as from 1 to 10 l ensiling agent, such as from 2 to 8 l ensiling agent, such as from 3 to 7 l ensiling agent, such as about 5 l ensiling agent per ton fresh forage.

One embodiment of the present invention relates to a method for ensiling forage, wherein said forage is selected from clover, grass, lucerne, cereals, maize or any combination or mixture thereof.

One embodiment of the present invention relates to the use of the ensiling agent of the invention in preparation of silage. Another embodiment of the present invention relates to the use of the ensiling agent of the present invention in preparation of silage from forage selected from clover, grass, lucerne, cereals, maize or any combination or mixture thereof.

As previously stated one object of the invention is to find an alternative ensiling agent to previously known ensiling agents for forage.

One object of the invention is to find an alternative ensiling agent which comprises less toxic components and/or components that may degrade to toxic compounds. Such toxic compounds may be compounds that are directly toxic to the animal eating the produced silage or it may be compounds which are present in animal derived products, such as milk and other dairy products and meat.

One object of the present invention is to provide an alternative method for ensiling forage to previously known ensiling methods.

One object of the present invention is to reduce or exclude hexamine in the ensiling agent. One additional object is to provide an ensiling agent which does not contain hexamine.

One object of the present invention is to reduce the nitrite content in the ensiling agent.

Ensiling is a process of preserving forage in a wet or semi-wet condition. A wet or semi-wet condition may contain up to 85% DM, such as up to 75% DM, such as up to 65%, such as up to 60% DM, such as up to 50% DM. Ensiling may involve growth of lactic acid bacteria. Silage, which is the product of ensilage, may be fermented forage.

As previously stated, two known ensiling agents are Promyr NF and Kofasil Ultra. Promyr NF contains formic acid, propionic acid and salts of organic acids. Kofasil Ultra contains sodium benzoate, sodium nitrite, hexamine and sodium propionate. The content of Kofasil Ultra is disclosed in table 1, in which also A5 is presented. Also a control without active components is presented in table 1.

TABLE 1

Composition of control, Kofasil Ultra and A5.

| Additive | Proportion in % | | | | |
|---|---|---|---|---|---|
| | Hexamine | Sodium nitrite | Sodium propionate | Sodium benzoate | Potassium sorbate |
| Control* | | | | | |
| Kofasil Ultra | 8 | 12 | 5 | 15 | |
| A5 | | 5 | | 20 | 10 |

*Control represents untreated silage and is used for comparison of ensiling treatments with untreated silage.

The performance of an ensiling agent is evaluated by the following characteristics of the silage: pH, ammonia nitrogen ($NH_3$—N), water soluble carbohydrates (WSC), lactic acid, acetic acid, butyric acid, ethanol, 2,3-butanediol, Clostridia spores, yeast, nitrate nitrogen ($NO_3$—N), nitrite nitrogen ($NO_2$—N), weight loss and aerobic stability.

The pH in the silage should be as low as possible because of its preserving effect. In general, a low dry matter (DM) content results in a low pH. By using ensiling agents according to the invention a low pH after 7 days of storage of low DM silage is obtained, in particular compared to silages treated with Kofasil Ultra (see table 3). Ensiling agents of the present invention also decrease the pH in low DM silages stored for 112 days compared to untreated silages and the resulting pH is lower compared to the pH for silages treated with Kofasil Ultra (see table 3). For treated high DM silages stored for 7 days, a lower pH is obtained by using ensiling agents of the invention compared to Kofasil Ultra (see table 4).

Ammonia nitrogen ($NH_3$—N) in silages is a product of proteolytic activities of Clostridia. The amount of ammonia nitrogen specifies how much ammonia nitrogen the silage contains proportionately to the total amount of nitrogen. The ammonia nitrogen content in silages should be low since increased values indicate the degradation of crop proteins by undesired activity of bacteria, eg Clostridia. Some ammonia nitrogen is however produced by degradation of nitrate and nitrite, which is naturally contained in the forage. A reduction of ammonia-N formation is obtained in low DM silages treated with ensiling agents of the invention compared to untreated silages (see table 3).

Water soluble carbohydrates (WSC) are needed in silages to ensure an energy source for lactic acid bacteria (LAB), wherein glucose and fructose are the most important WSC. The production of lactic acid by LAB has a preserving effect and prevents the growth of undesired microorganisms. The concentration of WSC in crops is one of the main factors influencing the ensilability of crops. The concentration of WSC, both in low DM silages and in high DM silages, is higher in silages treated with ensiling agents of the invention, in particular compared to untreated silages (see table 3 and 4).

A high lactic acid concentration is preferred in silages due to its preserving effect. As is disclosed in table 3, ensiling agents of the invention increase the lactic acid production in low DM silages compared to untreated silages and higher concentrations are obtained for silages treated with ensiling agents of the invention compared to silages treated with Kofasil Ultra or Promyr NF. According to table 4, production of lactic acid in high DM silages treated with ensiling agents of the invention is decreased compared to untreated silages, but the resulting lactic acid concentration is higher in silages treated with ensiling agents of the invention compared to silages treated with Promyr NF and Kofasil Ultra.

The concentration of acetic acid should be high since it suppresses the growth of yeast and moulds and aerobically stabilizes silages (Weinberg Z G, Ashbell G, Hen Y, Azrieli A (1993) The effect of applying lactic acid bacteria at ensiling on the aerobic stability of silages. J. Applied Bacteriol. 75: 512-518). The concentration of acetic acid in high DM silages treated with ensiling agents of the invention is decreased, but the resulting concentration is even lower in silages treated with Promyr NF (see table 4).

The butyric acid concentration should be low since it indicates growth of *Clostridium tyrobutyricum*, which is an undesirable bacterium. Butyric acid produced by Clostridia can be a sign that the pH has not dropped quickly enough in the silage. Ensiling agents of the invention decreases the butyric acid production in low DM silages compared to untreated silages (see table 3). Also reduction of butyric acid formation in high DM silages treated with ensiling agents of the invention are obtained compared to untreated silages (see table 4).

2,3-butanediol is produced by a butanediol fermentation performed by Enterobacteria in silage below pH 6.3 (McDonald P, Hendersen A R, & Heron S J E (1991) The Biochemistry of Silage. Chalcombe Publications, 13 Highwoods Drive, Marlow Bottom, Marlow Bucks, UK). Thus the fermentation product 2,3-butanediol is an indirect measurement of Enterobacteria activity. Enterobacteria are sensitive to low pH and the decline in their activity in silages can be assumed to be a potential measure of good ensiling conditions (Pahlow G, Muck R E, Driehuis F & Oude Elferink S J W H (2003) Microbiology of ensiling. Silage Sci. Tech., Agronomy monograph 42). In addition, Enterobacteria have the ability to degrade nitrate to nitrite and nitric oxide and thereby contribute to a reduction of growth of Clostridia in silages (Spoelstra S F (1987) Degradation of nitrate by Enterobacteria during silage fermentation of grass. Netherlands J. Agri. Sci. 35: 43-54). By using ensiling agents of the invention 2,3-butanediol concentrations in silages decrease, compared to untreated silages (see table 3 and 4).

Preferably the amount of Clostridia spores should be low in silages since they negatively affect the milk quality when milk cows are fed with silage containing high amount of Clostridia spores. Thus, Clostridia has an undesirable effect on the milk quality, which may lead to farmers getting less paid due to the presence of Clostridia in milk. Clostridia is one of the most detrimental types of microorganisms involved in the fermentation process. In the ensiled crop these heat-resistant spore building bacteria originate from soil or manure (Jonsson A (1989) The role of yeast and clostridia in silage deterioration. Swed. Univ. Agric. Sci., Dept. of Microbiology, Doctoral Thesis, Report 42, Uppsala, Sweden; Rammer C (1996) Manure in grass silage production. Effects on silage fermentation and its hygienic quality. Swed. Univ. Agric. Sci., Dept. of Animal Nutrition & management, Doctoral Thesis, Agraria 2, Uppsala, Sweden). Clostridia are undesirable because they ferment a variety of substrates and thus reduce substrate availability for lactic acid bacteria. In addition, some Clostridia ferment lactic acid and their end products have a low preservative capability resulting in high ensiling losses and low feeding value of silage. In low DM silages treated with ensiling agents of the invention, the number of Clostridia spores is lower compared to untreated silages (see table 3). In low DM silages treated with ensiling agents of the invention, the number of Clostridia spores is also lower compared to silages treated with Kofasil Ultra and Promyr NF (see table 3).

The yeast concentration should be low because yeast contributes to short durability. Especially at high DM yeast and mould are responsible for a majority of quality problems in silages. A main fermentation product of yeast is ethanol (McDonald P, Henderson A R & Heron S J E (1991) The Biochemistry of Silage. Chalcombe Publications, 13 Highwoods Drive, Marlow Bottom, Marlow, Bucks, UK. 111 pp.). Although yeast per se is not dangerous, its growth produces moisture resulting in growth of undesirable microorganisms. At low DM, the most potential risk is the growth of Clostridia. In high DM silages treated with ensiling agents of the invention, the yeast content is lower compared to untreated silages, whereas the yeast content in silages treated with Promyr NF is increased (see table 4). Ensiling agents of the invention decrease the ethanol concentrations in both low DM silages and high DM silages compared to untreated silages, and low DM silages treated with ensiling agents of the invention have lower ethanol content compared to Kofasil Ultra (see table 3 and 4).

Nitrate nitrogen ($NO_3$—N) and nitrite nitrogen ($NO_2$—N) concentrations in silages should be low and nitrate-N and nitrite-N should preferably be degraded quickly to low values after insertion of the silage. Slowly, nitrate degrades to nitrite and ammonia, but is used in the ensiling agent since it also counteracts Clostridia. Nitrite-N ($NO_2$—N) concentrations are lower in low DM silages when treated with ensiling agents of the invention compared to silages treated with Kofasil Ultra after 7 and 14 days storage (see table 6). In high DM silages treated with ensiling agents of the invention, the concentration of nitrate-N ($NO_3$—N) after 119 days decrease compared to initial concentration, whereas the concentration of nitrate-N in silages treated with Kofasil Ultra increase (see table 7). In high DM silages treated with ensiling agents of the invention, the concentration of nitrite-N decrease already after 7 days of storage (see table 8).

Weight loss is caused by undesirable activities of Clostridia and yeasts during the fermentation process. In both low DM silages and high DM silages treated with ensiling agents of the invention the weight loss is reduced compared to untreated silages (see table 9 and 10). This is particularly pronounced in low DM silages.

Aerobic stability is an important factor when considering the period after opening the silage. Aerobic stability is a measure of the period wherein the quality of the silage is maintained at a suitable level. A high aerobic stability enables feeding animals with the silage during a longer period after opening the silage. The aerobic stability can be determined by measuring the temperature increase, since an increase in temperature is caused by microbial activity, which indicates onset of aerobic deterioration of silage. A slower temperature increase indicates a more aerobically stable silage. According to table 11, in low DM silages treated with ensiling agents of the invention, the time until the temperature of the silage has increased above 2° C. in relation to ambient temperature is longer than in untreated silages, and silages treated with Kofasil Ultra and Promyr NF. Thus, low DM silages treated with ensiling agents of the invention are more aerobically stable than untreated silages and silages treated with Kofasil Ultra and Promyr NF. In high DM silages treated with ensiling agents according to the invention, the increased aerobic stability compared to untreated silages and silages treated with Promyr NF is more pronounced, since in high DM silages treated with ensiling agents of the invention the time until the temperature of the silage has increased above 2° C. and 5° C. in relation to ambient temperature is longer than in untreated silages and silages treated with Promyr NF (see table 12).

The ensiling agents of the present invention also show favorable preserving effects on silages having a very high DM, such as up to 85%, such as up to 75%, such as up to 65%, such as up to 60%, such as up to 50%.

Low DM silage refers to any silage having up to 30% DM, such as 20-30% DM, and 15-20%.

High DM silage refers to any silage having above 30% DM, such as 35-50% DM, and 40-50%.

Surprisingly the combination of the components used in the ensiling agents of the present invention results in unexpected ensiling properties, as disclosed above. The overall ensiling properties are surprising since hexamine is not present and the content of sodium nitrite is low, which reduces the risk of toxic effects in animals eating the silage or in products obtained from these animals, such as dairy products etc. Furthermore the ensiling agents according to the present invention are not corrosive which result in less corrosion damages on equipment. Preferred embodiments of ensiling agents according to the present invention are not considered as toxic, and has a good storage stability including stability upon opening. The lack of toxicity is considered as a result of the low sodium nitrite level and the lack of hexamine. Another advantage of ensiling agents according to the present invention is that due to the low sodium nitrite level there is no need for a long waiting period before feeding the silage to the animal, which is the case for Kofasil Ultra. Already after 7 days of storage, silages treated with ensiling agents of the invention have a nitrite-N concentration being at the same level as untreated silages.

The present invention is considered to be well suited as ensiling agent and surprisingly efficient compared to the ensiling agents Promyr NF and Kofasil Ultra presently on the market, in particular in view of it being much less corrosive compared to Promyr NF and the lack of hexamine. The ensiling performance of the present invention compared to Kofasil Ultra is especially good when considering that the effect can be achieved without hexamine, and optionally with a low sodium nitrite level.

The present inventors discovered that the combination of the three active components of the present invention improved the properties of the silage compared to only using two of the active components, for example a much lower concentration of Clostridia and high concentration of lactic acid was detected when using all three active components.

The amount of ensiling agent added to the forage can be varied and still be within the scope of the present invention. However, a larger amount of ensiling agent will make the ensilage and thus the silage less economical to use.

The ensiling agent according to the present invention may be added to the forage from cutting of the forage until the ensiling process is sealed, eg by being covered with plastic, or where a container, such as a silo, is used by closing the container.

The ensiling agent according to the present invention may contain the active components, ie sodium nitrite, sodium benzoate, potassium sorbate and optionally one or more additional component, as well as one or more aqueous solvent, such as water; organic acids, such as propionic acid and formic acid; and alcohols, such as ethanol and glycerol; as well as mixtures thereof.

The above mentioned embodiment A5 contains 5% by weight sodium nitrite, 20% by weight sodium benzoate, 10% by weight potassium sorbate, and 65% by weight water.

The portion of sodium nitrite can be varied and still be within the scope of the present invention and a higher sodium nitrite content will make the ensiling agent more toxic.

The sodium benzoate and/or potassium sorbate content may be varied and still be within the scope of the present invention and a higher sodium benzoate and/or potassium sorbate content will make the ensiling agent less economical to use.

The ensiling agent according to the present invention may be a solid agent comprising the active components of the present invention, wherein the solid agent is intended to be prepared before use, e.g. by adding the appropriate amount of an aqueous solvent.

The above described characteristics of silages treated with ensiling agents of the present invention are particularly pronounced for the embodiment A5. However, it is considered obvious in the art that the composition of the present invention can be varied and still be within the scope of the present invention. Such variations may be different compositions of the components, such as different proportions. It is also obvious for a person skilled in the art that additional components may be added to the composition and still be within the scope of the invention.

The following definitions are used in the present invention:

In the present invention the term "forage" means plants intended as animal feed.

In the present invention the term "crop" means a plant grown and harvested for agricultural use.

In the present invention the terms forage and crop are used interchangeably.

In the present invention the term "ensilage" means the process of preserving forage in a wet or semi-wet condition.

As used in the present invention silage means the product obtained by ensilage.

In the present invention the term "ensiling agent" means any composition, additive or mixture that is added to forage in order to assist the ensilage procedure to prevent improper fermentation.

In the present invention the term "DM" means the dry matter content in the forage or silage.

In the present invention "%" relates to % by weight if not otherwise stated.

In the present invention the terms "nitrate nitrogen", "nitrate-N" and "$NO_3$—N" are used interchangeably and the terms mean nitrogen that are in the form of nitrate.

In the present invention the terms "nitrite nitrogen", "nitrite-N" and "$NO_2$—N" are used interchangeably and the terms mean nitrogen that are in the form of nitrite.

In the present invention the terms "ammonia nitrogen", "ammonia-N" and "$NH_3$—N" are used interchangeably and the terms mean nitrogen that are in the form of ammonia.

In the present invention the term "CP" means the crude proteins contained in the forage.

In the present invention "FM" means fresh material.

Wherever an interval is present it is intended to mean each individual number within the interval, as well as each possible subinterval within the interval, for example the interval from 0 to 50 comprises the subintervals from 2 to 10, from 25.1 to 25.5 and from 5 to 40 etc.

EXAMPLE 1

Preparation and Analysis of Fresh Forage

A mixture of clover-grass forage (proportion 8:92) at third cut was used at the present experiment. The forage was wilted to two DM levels, low DM level and high DM level. The crop targeting the low DM level was wilted for 12 hours and the crop targeting the high DM level was wilted for 48 hours on barn drier. The crop from both DM levels was chopped in a stationary cutter head to approximately 5 cm particle length after being wilted.

The chemical composition of samples of the fresh forage was determined. Samples were analysed for DM according to Rammer (Rammer C (1996) Quality of grass silage infected with spores of *Clostridium tyrobutyricum*. Grass and Forage Science. Vol 51, p 88-95), for ash after 3 hours ashing at 550° C., enzymatically for water-soluble carbohydrates (WSC) after acid hydrolysis (Larsson K & Bengtsson S (1983) Bestämning av lätt tillgängliga kolhydrater i växtmaterial. (Determination of non structural carbohydrates in plant material.) Method description no 22. National Laboratory for Agricultural Chemistry, Uppsala, Sweden), for crude protein (CP) by using the Kjeldahl technique with Cu as catalyst (Bremner J M & Breitenbeck G A (1983) A simple method for determining ammonium in semi-micro Kjeldahl analysis of soil and plant materials using block digester. Comm. Soil Sci. Plant Anal. 14: 905-913), and for buffering capacity. Buffering capacity is defined as the relative ability of the forage juice to resist a pH drop down to pH 4.0 and is measured as g lactic acid (LA)/100 g dry matter (DM).

Microbiological composition of fresh forage was analysed by determination of yeast, mould, lactic acid bacteria and Clostridia spores from samples at each obtained DM level. The yeast and mould counts were determined by the spread plate method, wherein serial dilutions of silage samples were cultured aerobically at 25° C. on malt extract agar supplemented with penicillin G (30 mg/L) and streptomycine sulphate (30 mg/L). Clostridia spores were determined by the spread plate method according to Jonsson (Jonsson A (1990) Enumeration and confirmation of *C. tyrobutyricum* in silages using neutral red. D-cycloserine and lactate dehydrogenase activity. J. Dairy Sci. 73: 719-725). Lactic acid bacteria were determined by the spread plate method according to Pahlow (Pahlow G (1990) Untersuchung des epiphytischen Besatzes von Siliergut mit Milchsäurebakterien (Determination of epiphytic LAB in ensiled forage). Unpublished paper. Bundesforschungsanstalt für Landwirtschaft (FAL), Institut für Grünland-und Futterpflanzenforschung, DE-3300 Braunschweig. 6 pp.)

A spore suspension of Clostridia was applied on the crop, placed on plastic sheet, by spraying at a rate of $10^3$ CFU (colony-forming units) per g fresh forage. Clostridia spores were determined from samples both before and after the application of the suspension.

The chemical and microbiological composition of fresh forage is presented in table 2.

TABLE 2

Chemical and microbiological compositions of fresh forage.

| | | DM level | |
|---|---|---|---|
| Analyses | Unit | Low | High |
| DM | g/kg FM* | 229 | 464 |
| Ash | g/kg DM | 216.4 | 217.5 |
| CP | g/kg DM | 143.8 | 147.4 |
| WSC | g/kg DM | 59.7 | 64.0 |
| $NO_3$—N | mg/kg DM | 98.0 | 118.8 |
| $NO_2$—N | mg/kg DM | 13.9 | 6.7 |
| Buf. capacity | g LA**/100 g DM | 5.5 | 5.5 |
| LAB | log CFU/g FM* | 4.40 | 3.41 |
| Yeast | log CFU/g FM* | 3.47 | 2.76 |
| Mould | log CFU/g FM* | 2.35 | 1.00 |
| Clostridia spores | | | |
| before suspension | log CFU/g FM* | 2.17 | 2.62 |
| after suspension | log CFU/g FM* | 2.71 | 2.70 |

*fresh material
**lactic acid

EXAMPLE 2

Preparation and Analysis of Silage

The ensiling agents presented in table 1, as well as Promyr NF, were added to the wilted and chopped crop prepared in example 1. These ensiling agents were applied on the crop placed on plastic sheet by spraying at the application rate of 5 liters/ton of fresh forage at both DM levels. Prior to additive application, the ensiled forage was inoculated with spore suspension of *Clostridium tyrobutyricum* at a rate of $10^3$ CFU per g fresh forage in the same way as the additives. Forages were ensiled in PVC laboratory silos (4.5 l) and in glass containers of 1.7 l volume at a density of 118 kg DM/$m^3$ at low DM level and 167 kg DM/$m^3$ at high DM level. PVC silos were stored in approximately 120 days while the crops in glass containers were stored for 7 and 14 days; all in room temperature.

At the last day of each storage period, silos were opened and their whole content was emptied to a separate plastic bag, mixed thoroughly and representative samples were taken. Samples from silages stored 7 and 14 days were examined for DM, pH and $NO_2$—N and $NO_3$—N following the procedure disclosed in ASN 110-01/92 (Application Sub Note 110-01/92. Determination of nitrate-N and nitrite-N in water by flow injection analysis. Foss Tecator, Hilleröd, Denmark). Samples stored 120 days were analysed for DM, pH, WSC, CP, fatty acids (lactic acid, acetic acid, butyric acid),

TABLE 3

Composition of low DM silages after 112 days of storage.

| Silage treatment | DM % | pH at day 7 | pH at day 112 | $NH_3$—N g/kg TN* | WSC | Lactic acid | Acetic acid | Butyric acid | Ethanol | 2,3-butanediol | Clostridia spores log CFU/g FM** | Yeast log CFU/g FM** |
|---|---|---|---|---|---|---|---|---|---|---|---|---|
| | | | | | | | g/kg DM | | | | | |
| Control | 20.8 | 4.7 | 5.3 | 189.4 | 1.3 | 7.8 | 16.5 | 47.1 | 7.6 | 1.3 | 5.7 | 0 |
| Kofasil Ultra | 22.9 | 5.1 | 4.4 | 72.2 | 1.1 | 77.0 | 17.6 | 0.6 | 4.4 | 0.4 | 1.4 | 0 |

TABLE 3-continued

Composition of low DM silages after 112 days of storage.

| Silage treatment | DM % | pH at day 7 | pH at day 112 | NH₃—N g/kg TN* | WSC | Lactic acid | Acetic acid | Butyric acid | Ethanol | 2,3-butanediol | Clostridia spores | Yeast |
|---|---|---|---|---|---|---|---|---|---|---|---|---|
| | | | | | | | g/kg DM | | | | log CFU/g FM** | |
| Promyr NF | 22.8 | 4.7 | 4.1 | 79.8 | 1.9 | 67.9 | 14.6 | 1.4 | 2.8 | 0.5 | 4.1 | 0 |
| A5 | 22.6 | 4.7 | 4.3 | 85.9 | 2.3 | 81.1 | 16.0 | 1.5 | 2.7 | 0.4 | 1.1 | 0 |

*total nitrogen
**fresh material

TABLE 4

Composition of high DM silages after 119 days of storage.

| Silage treatment | DM % | pH at day 7 | pH at day 112 | NH₃—N g/kg TN* | WSC | Lactic acid | Acetic acid | Butyric acid | Ethanol | 2,3-butanediol | Clostridia spores | Yeast |
|---|---|---|---|---|---|---|---|---|---|---|---|---|
| | | | | | | | g/kg DM | | | | log CFU/g FM** | |
| Control | 44.0 | 5.7 | 4.9 | 90.9 | 15.1 | 42.9 | 5.5 | 0.3 | 5.1 | 2.7 | 2.2 | 4.7 |
| Kofasil Ultra | 44.5 | 6.3 | 5.1 | 58.5 | 29.0 | 34.7 | 5.4 | 0.2 | 2.0 | 0.4 | 2.6 | 0 |
| Promyr NF | 46.2 | 5.7 | 5.1 | 67.2 | 41.0 | 18.5 | 3.5 | 0.2 | 3.0 | 0.4 | 2.5 | 5.0 |
| A5 | 44.2 | 6.1 | 5.0 | 84.7 | 28.7 | 35.5 | 4.5 | 0.2 | 2.2 | 0.4 | 2.6 | 0 |

*total nitrogen
**fresh material ethanol, 2,3-butanediol and ammonia-N following the procedure disclosed in ASN 50-01/92 (Application Sub Note 50-01/92. Determination of ammonia nitrogen in water by flow injection analysis. Foss Tecator, Hilleröd, Denmark), and $NO_2$—N and $NO_3$—N following the procedure disclosed in ASN 110-01/92 (ibid). Number of Clostridia spores and lactate assimilating yeasts were also identified in the samples from the 120 days stored silages. Silage pH was measured in silage juice. Concentrations of fatty acids, ethanol and 2,3-butanediol were determined from silage juice using HPLC according to Andersson and Hedlund (Andersson R & Hedlund B (1983) HPLC analysis of organic acids in lactic acid fermented vegetables. Z. Lebensm.-Untersuch. Forsch. 176: 440-443). Other properties were determined in the same way as in example 1.

The fermentation quality of low DM silages is illustrated in table 3. Ensiling characteristics of high DM silages are presented in table 4.

The concentrations of nitrate-N and nitrite-N in low DM silages during the ensiling period are illustrated in tables 5 and 6 respectively. The concentrations of nitrate-N and nitrite-N in high DM silages are illustrated in tables 7 and 8 respectively. Forage treated according to control represents untreated silage.

TABLE 5

Concentration of nitrate-N in low DM silages.

| Silage treatment | Nitrate-N (mg/kg DM) at day | | | |
|---|---|---|---|---|
| | 0 | 7 | 14 | 112 |
| Control | 98.0 | 1.2 | 0.8 | 0.6 |
| Kofasil Ultra | 98.0 | 42.3 | 32.1 | 5.7 |
| Promyr NF | 98.0 | 30.1 | 23.3 | 18.4 |
| A5 | 98.0 | 28.6 | 33.3 | 29.7 |

TABLE 6

Concentration of nitrite-N in low DM silages.

| Silage treatment | Nitrite-N (mg/kg DM) at day | | | |
|---|---|---|---|---|
| | 0 | 7 | 14 | 112 |
| Control | 13.9 | 2.1 | 1.9 | 1.8 |
| Kofasil Ultra | 806.9 | 10.9 | 6.6 | 1.8 |
| Promyr NF | 13.9 | 3.7 | 2.6 | 2.1 |
| A5 | 344.3 | 4.3 | 2.8 | 1.9 |

TABLE 7

Concentration of nitrate-N in high DM silages.

| Silage treatment | Nitrate-N (mg/kg DM) at day | | | |
|---|---|---|---|---|
| | 0 | 7 | 14 | 119 |
| Control | 118.8 | 12.4 | 2.5 | 1.2 |
| Kofasil Ultra | 118.8 | 147.1 | 141.8 | 139.6 |
| Promyr NF | 118.8 | 95.4 | 97.7 | 58.9 |
| A5 | 118.8 | 122.6 | 89.6 | 100.7 |

TABLE 8

Concentration of nitrite-N in high DM silages.

| Silage treatment | Nitrite-N (mg/kg DM) at day | | | |
|---|---|---|---|---|
| | 0 | 7 | 14 | 119 |
| Control | 6.7 | 8.9 | 7.1 | 4.6 |
| Kofasil Ultra | 399.7 | 13.8 | 14.6 | 7.0 |
| Promyr NF | 6.7 | 9.1 | 9.3 | 6.5 |
| A5 | 170.5 | 9.9 | 10.2 | 6.5 |

EXAMPLE 3

Analysis of Weight Loss

PVC silos prepared according to example 2 and stored for approximately 120 days were weighed at the time of filling and then after 3, 10, 30, 61, and 120 days to determine weight losses, which were assumed to originate from the silage DM and being in lost as $CO_2$. The weight losses were expressed in % of DM content in the silo at filling.

Weight losses in low DM silages and high DM silages during the ensiling period are illustrated in tables 9 and 10 respectively. Forage treated according to control represents untreated silage.

TABLE 9

Weight losses in low DM silages.

| Silage treatment | Weight losses (% of DM weight) at day | | | |
|---|---|---|---|---|
| | 3 | 10 | 30 | 61 |
| Control | 1.78 | 2.39 | 4.17 | 5.82 |
| Kofasil Ultra | 0.66 | 1.19 | 1.66 | 2.25 |
| Promyr NF | 0.50 | 0.89 | 1.36 | 1.92 |
| A5 | 0.75 | 1.28 | 1.66 | 2.15 |

TABLE 10

Weight losses in high DM silages.

| Silage treatment | Weight losses (% of DM weight) at day | | | |
|---|---|---|---|---|
| | 3 | 10 | 30 | 61 |
| Control | 0.77 | 1.37 | 1.82 | 2.19 |
| Kofasil Ultra | 0.26 | 0.50 | 0.79 | 1.13 |
| Promyr NF | 0.31 | 0.60 | 0.85 | 1.13 |
| A5 | 0.30 | 0.60 | 0.94 | 1.28 |

EXAMPLE 4

Analysis of Aerobic Stability

Aerobic stability was determined in silages prepared according to example 2 and stored for approximately 120 days by measuring the temperature increase. Temperature in silages was measured in 1300 ml PVC pipes covered at the bottom with a PE fibre net and filled with silage in relation to their DM content according to the equation: filling weight (g FM)=$((-205.57 \times \ln(\% DM))+1061)$. Pipes were placed in an insulating Styrofoam block and kept in room temperature for 6-7 days. The aerobic stability, represented by the temperature increase, in low DM and high DM silages are illustrated in tables 11 and 12 respectively. Forage treated according to control represents untreated silage.

TABLE 11

Aerobic stability in low DM silages.

| Silage treatment | Time (days) until temperature, in relation to ambient temperature, increase above | |
|---|---|---|
| | 2° C. | 5° C. |
| Control | 6.2 | 6.8 |
| Kofasil Ultra | 6.6 | 6.8 |
| Promyr NF | 6.7 | 6.8 |
| A5 | 6.8 | 6.8 |

TABLE 12

Aerobic stability in high DM silages.

| Silage treatment | Time (days) until temperature, in relation to ambient temperature, increase above | |
|---|---|---|
| | 2° C. | 5° C. |
| Control | 1.8 | 3.9 |
| Kofasil Ultra | 7.5 | 7.5 |
| Promyr NF | 5.5 | 5.8 |
| A5 | 7.5 | 7.5 |

EXAMPLE 5

Supplementary Fermentation Experiments with A5

Fourteen experiments were started during the period from June to October. Except for experiments with precise-chopped maize, forages were chopped in a stationary cutter head to approx. 5 cm particle length. Basis data of the particular experiment including botanical composition and maturity of used forages is presented in table 13. After the chopping, the forage was mixed and divided into 2 fractions of approx. 3 kg fresh material (FM) each. The one forage fraction was treated with additive A5 at the rate of 5 ml per kg FM if crop contained less than 30% DM, or 3 ml per kg FM when crop contained above 30% DM. The second forage fraction was left untreated and is used as control. Silage additives were applied with a spray bottle on the forage and mixed thoroughly in a plastic bag. Forage from each fraction was then ensiled in 3 lab-silos (1.7 liters volume with a fermentation lock on lid). Directly after silo filling water was added in the fermentation lock to achieve airtight sealing. In total 6 silos in each experiment were produced. Silos were stored in room temperature (20-24° C.) for at least 90 days, except for stability experiment (48 days).

Two samples of fresh crop prior to additive application were collected in each experiment. Each sample was mixed and divided into 3 sub-samples; microbiological sample, chemical sample and reserve sample. Microbiological samples were analysed for lactic acid bacteria (LAB) and clostridia spores (5 experiments). Chemical analyses determined DM, ash, total nitrogen (TN), WSC, nitrite and buffering capacity (BC) of harvested crop. Reserve sample was frozen. In addition, botanical composition of harvested crop and growing stage of plant were assessed.

At the end of storage, silo content was emptied to the separate plastic bag, mixed thoroughly and samples for microbiological analysis, chemical analysis, aerobic stability determination and reserve sample were extracted. Microbiological analyses consisted of determination of lactate-assimilating yeasts and clostridia spores. Silages were chemically analysed for DM, pH, ammonia-N, WSC, fatty acids, ethanol and 2,3-butanediol.

Storage stability in silages was determined by measuring the temperature increase. Temperature in silages was measured in 1300 ml PVC pipes covered at the bottom with a PE fibre net and filled with silage in relation to their DM content according to the equation: filling weight (g FM)= ((−205.57×ln(% DM))+1061). Pipes were placed in an insulating Styrofoam block and kept in a room temperature for 5-7 days.

TABLE 13

The composition and stage of development of forages used in experiments.

| Exp | Date of harvest | Weather | Type of crop | Maturity of main crops |
|---|---|---|---|---|
| I. | 2007 Jun. 01 | sunny, hot, 25° C. | Lucerne (100%) | Mid-bud - Early bloom |
| II. | 2007 Jun. 01 | sunny, hot, 25° C. | Red clover (90%) Timothy | Mid-bud - Early bloom; No heads visible |
| III. | 2007 Jun. 04 | sunny, hot, 25° C. | Timothy + meadow fescue (95%) Red clover | Heads fully emerge; Mid-bud - Early bloom |
| IV. | 2007 Jun. 04 | sunny, hot, 25° C. | Red clover (60%) Timothy + meadow fescue (40%) | Mid-bud - Early bloom; Heads fully emerge |
| V. | 2007 Jun. 05 | sunny, hot, 25° C. | Meadow fescue (60%) Timothy (30%) Weeds | Heads fully emerge, before flowering |
| VI. | 2007 Jun. 05 | sunny, hot, 25° C. | Timothy + meadow fescue (95%) Red clover | Heads fully emerge; Mid-bud - Early bloom |
| VII. | 2007 Jun. 05 | sunny, hot, 25° C. | Meadow fescue (60%) Timothy (30%) Weeds | Heads fully emerge, before flowering |
| VIII. | 2007 Jul. 17 | sunny, hot, 25° C. | Whole-crop barley (100%) | Soft dough stage |
| IX. | 2007 Jul. 17 | sunny, hot, 25° C. | Red clover (80%) White clover (10%) Grasses Weeds | Full-bloom; Full-bloom; Full-bloom |
| X. | 2007 Jul. 25 | sunny, hot, 25° C. | Timothy + meadow fescue (85%) Red clover | Full-bloom; Full-bloom |
| XI. | 2007 Jul. 26 | sunny, hot, 25° C. | Timothy + meadow fescue (85%) Red clover | Full-bloom; Full-bloom |
| XII. + XIII. | 2007 Nov. 01 | Somewhat cloudy with sprinkles | Maize (100%) | Hard dough stage |
| XIV. | 2007 Nov. 01 | Somewhat cloudy with sprinkles | Red clover (85%) Grasses | Full-bloom; Prebooting (stage 3), part of penicles visible |

Silos were weighed at the time of filling and then at approx. 3, 10, 30, 60, 90 and 100 days of storage to determine weight losses. The weight losses were expressed in % of DM content in the silo at filling.

Fresh Forages

The chemical and microbial composition of forages prior to ensiling is illustrated in table 14. Table 14 also include fermentation coefficient (FC=DM +(8×WSC/BC)) of the crop, where BC is buffering capacity.

TABLE 14

The composition of forages prior to ensiling.

| Exp. | DM % | Ash | CP | WSC | NO$_3$ | Buf. Capacity g LA**/100 g DM | LAB*** log CFU/g FM**** | Clostridia spores | FC |
|---|---|---|---|---|---|---|---|---|---|
| | | | % of DM | | | | | | |
| WR1a | | | | | | | | | |
| I. | 15.7 | 9.4 | 20.0 | 8.2 | 0.15 | 6.7 | 3.4 | 2.0* | 25 |
| II. | 13.1 | 12.4 | 19.9 | 11.0 | 0.08 | 5.7 | 3.2 | 2.0* | 29 |
| IX. | 18.3 | 10.7 | 19.8 | 5.7 | 0.02 | 7.2 | 3.7 | 1.7* | 25 |
| XIV. | 17.2 | 9.5 | 17.2 | 6.3 | 0.02 | 10.7 | 5.5 | 3.7 | 22 |
| WR1b | | | | | | | | | |
| III. | 26.2 | 8.7 | 14.0 | 17.7 | 0.02 | 5.1 | 2.8 | | 54 |
| IV. | 25.1 | 8.0 | 17.5 | 12.9 | 0.01 | 5.4 | 2.9 | | 44 |

TABLE 14-continued

The composition of forages prior to ensiling.

| Exp. | DM % | Ash | CP | WSC | NO₃ | Buf. Capacity g LA**/100 g DM | LAB*** log CFU/g FM**** | Clostridia spores | FC |
|---|---|---|---|---|---|---|---|---|---|
| | | | % of DM | | | | | | |
| V. | 23.9 | 7.6 | 13.9 | 14.3 | 0.01 | 4.2 | 0.8 | | 51 |
| VIII. | 28.2 | 8.7 | 13.1 | 14.8 | 0.07 | 3.4 | 6.0 | | 62 |
| X. | 23.5 | 10.6 | 12.4 | 11.9 | 0.03 | 4.2 | 4.4 | | 46 |
| WR1c | | | | | | | | Yeast | |
| VI. | 47.6 | 9.6 | 16.9 | 14.1 | 0.25 | 5.1 | 4.0 | | 70 |
| VII. | 41.1 | 8.3 | 19.0 | 9.3 | 0.35 | 3.8 | 0.8 | | 61 |
| XI. | 44.4 | 10.0 | 14.5 | 11.7 | 0.16 | 4.5 | 4.3 | | 65 |
| XII. + VIII | 39.1 | 6.9 | 9.4 | 1.0 | 0.03 | 4.4 | 7.4 | 6.0 | 41 |

*Analyses provided from frozen sample
**lactic acid
***lactic acid bacteria
****fresh material

TABLE 15

Chemical and microbiological compositions of silages from difficult ensilable forages.

| Treatment | DM % | pH | $NH_3$—N* % of TN** | Propionic acid | Lactic acid | Acetic acid | Butyric acid | 2,3-butanediol | Ethanol | Lactate yeasts | Clostridia spores |
|---|---|---|---|---|---|---|---|---|---|---|---|
| | | | | | | % of DM | | | | log CFU/g FM*** | |
| Experiment I. | | | | | | | | | | | |
| Control | 13.4 | 5.6 | 32.3 | 1.2 | 0.1 | 6.4 | 10.6 | <0.2 | 1.3 | <1.7 | 6.1 |
| A5 | 16.2 | 4.3 | 6.6 | <0.2 | 12.4 | 3.3 | <0.1 | <0.2 | 0.5 | <1.7 | 2.0 |
| Experiment II. | | | | | | | | | | | |
| Control | 12.7 | 4.4 | 10.2 | <0.2 | 10.9 | 2.7 | 2.2 | 0.8 | 1.0 | <1.7 | 3.8 |
| A5 | 13.4 | 3.9 | 4.4 | <0.2 | 15.8 | 2.3 | <0.1 | <0.2 | 0.3 | <1.7 | 2.1 |
| Experiment IX. | | | | | | | | | | | |
| Control | 15.4 | 5.8 | 20.1 | 1.0 | 0.2 | 4.0 | 5.8 | 3.6 | 1.8 | <1.7 | 3.1 |
| A5 | 18.5 | 4.3 | 5.0 | <0.2 | 9.8 | 1.8 | <0.1 | <0.2 | 0.3 | <1.7 | <1.7 |
| Experiment XIV. | | | | | | | | | | | |
| Control | 17.1 | 4.7 | 8.5 | <0.1 | 6.0 | 1.6 | 3.4 | 0.2 | 1.2 | <1.7 | 5.2 |
| A5 | 18.1 | 4.1 | 4.7 | <0.1 | 10.9 | 1.2 | <0.1 | 0.1 | 0.3 | <1.7 | <1.7 |

*The value is corrected for N added with the additive in form of $NaNO_2$.
**total nitrogen
***fresh material Silages from Difficult Ensilable Forages (WR1a, Tables 15-17)

The fermentation quality of A5 treated silages and untreated control silages from 4 experiments are demonstrated in table 15. In all studies A5 was found to give significantly lower pH values, lower acetic acid, butyric acid, ammonia-N and ethanol concentrations compared with untreated control treatments. The production of 2,3-butanediol was markedly lesser while using A5 in studies II and IX as well as propionic acid in studies I and IX. On the other hand, concentrations of lactic acid were considerably increased while using A5 in comparison with control treatments. Numbers of clostridia spores were noticeably reduced using A5. Microbiological analyses did not detect yeasts in any of treatments using A5.

Weight Loss

A5 significantly reduced weight losses during the whole ensiling period (see table 16).

TABLE 16

Weight losses of silages from difficult ensilable forages during the storage period.

| Treatment | Weight losses (% of DM weight) at day | | | | | | |
|---|---|---|---|---|---|---|---|
| Exp. I | 0 | 3 | 10 | 30 | 60 | 90 | 125 |
| Control | 0.0 | 2.7 | 3.8 | 5.8 | 10.4 | 12.9 | 14.2 |
| A5 | 0.0 | 0.8 | 1.7 | 2.5 | 3.3 | 3.8 | 4.5 |
| Exp. II | 0 | 3 | 10 | 30 | 60 | 90 | 125 |
| Control | 0.0 | 2.0 | 2.7 | 3.7 | 4.8 | 5.9 | 6.8 |
| A5 | 0.0 | 0.3 | 0.7 | 1.2 | 1.7 | 2.1 | 2.5 |
| Exp. IX | 0 | 3 | 10 | 30 | 60 | 90 | 118 |
| Control | 0.0 | 3.4 | 4.9 | 7.3 | 9.8 | 11.1 | 11.8 |
| A5 | 0.0 | 0.3 | 0.6 | 0.9 | 1.3 | 1.6 | 1.9 |

TABLE 16-continued

Weight losses of silages from difficult ensilable forages during the storage period.

| Treatment | Weight losses (% of DM weight) at day | | | | | |
|---|---|---|---|---|---|---|
| Exp. XIV | 0 | 3 | 9 | 29 | 63 | 98 |
| Control | 0.0 | 2.3 | 2.7 | 3.9 | 5.6 | 6.8 |
| A5 | 0.0 | 0.8 | 1.0 | 1.4 | 1.9 | 2.6 |

Storage Stability

Storage stability measurements from difficult ensilable forages showed no differences between A5 and control treatments (see table 17).

TABLE 17

Storage stability of silages from difficult ensilable forages expressed in increase of temperature.

| | Time (days) until temperature in aerated silages, in relation to ambient temperature, increase above | |
|---|---|---|
| Treatment | 2° C. | 5° C. |
| Experiment I. Ambient temp.: 20.4° C. | | |
| Control | 7.3 | 7.3 |
| A5 | 7.3 | 7.3 |
| Experiment II. Ambient temp.: 20.4° C. | | |
| Control | 7.3 | 7.3 |
| A5 | 7.3 | 7.3 |
| Experiment IX. Ambient temp.: 20.2° C. | | |
| Control | 6.1 | 6.1 |
| A5 | 6.1 | 6.1 |
| Experiment XIV. Ambient temp.: 19.9° C. | | |
| Control | 6.8 | 6.8 |
| A5 | 6.8 | 6.8 |

Silages from Intermediate or Easy Ensilable Forages with Low DM Content (WR1b, Tables 18-20)

Ensiling characteristics of A5 treated silages and untreated control silages are presented in table 18. Treatments with A5 showed a lower concentration of butyric acid, and 2,3-butanediol but higher concentration of acetic acid in comparison with control treatments. Ethanol and ammonia-N formation was significantly reduced in all A5 treatments compared to controls. Compared to controls, significantly reduced numbers of clostridia spores were found in A5 treatments in studies III, IV, V, and VIII.

TABLE 18

Chemical and microbiological compositions of silages from intermediate or easy ensilable forages with low DM content.

| Treatment | DM % | pH | NH₃—N* % of TN** | Propionic acid | Lactic acid | Acetic acid | Butyric acid | 2,3-butanediol | Ethanol | Lactate yeasts log CFU/g FM*** | Clostridia spores |
|---|---|---|---|---|---|---|---|---|---|---|---|
| | | | | | | % of DM | | | | | |
| Experiment III. | | | | | | | | | | | |
| Control | 24.9 | 4.4 | 7.6 | <0.2 | 6.2 | 1.6 | 0.6 | 0.3 | 1.7 | <1.7 | 3.0 |
| A5 | 25.9 | 4.4 | 5.8 | <0.2 | 5.9 | 2.2 | <0.1 | <0.2 | 0.7 | <1.7 | <1.7 |
| Experiment IV. | | | | | | | | | | | |
| Control | 23.8 | 4.5 | 10.6 | <0.2 | 7.7 | 1.0 | 1.9 | 1.5 | 1.6 | <1.7 | 4.8 |
| A5 | 24.9 | 4.2 | 5.1 | <0.2 | 8.7 | 1.6 | 0.1 | <0.2 | 0.6 | <1.7 | <1.7 |
| Experiment V. | | | | | | | | | | | |
| Control | 22.4 | 4.7 | 9.3 | 0.3 | 3.1 | 0.7 | 3.7 | 0.6 | 2.6 | <1.7 | 6.4 |
| A5 | 23.4 | 4.3 | 5.4 | <0.2 | 5.4 | 1.8 | <0.1 | <0.2 | 0.8 | <1.7 | <1.7 |
| Experiment VIII. | | | | | | | | | | | |
| Control | 25.3 | 5.2 | 17.9 | 0.4 | 2.2 | 0.3 | 4.1 | 4.6 | 3.6 | <1.7 | 6.6 |
| A5 | 28.5 | 4.2 | 8.8 | <0.2 | 7.2 | 0.7 | <0.1 | 0.6 | 0.6 | <1.7 | <1.7 |
| Experiment X. | | | | | | | | | | | |
| Control | 23.6 | 3.9 | 7.5 | <0.2 | 9.1 | 1.7 | <0.1 | <0.2 | 1.1 | 3.0 | <1.7 |
| A5 | 23.7 | 4.0 | 5.1 | <0.2 | 7.9 | 1.6 | <0.1 | <0.2 | 0.4 | <1.7 | <1.7 |

*The value is corrected for N added with the additive in form of NaNO₂.
**total nitrogen
***fresh material Weight Loss Weight losses were lower in A5 treatments compared with control treatments during the whole ensiling period (see table 19).

TABLE 19

Weight losses of silages from intermediate or easy ensilable forages with low DM content during the storage period.

| Treatment | Weight losses (% of DM weight) at day | | | | | | |
|---|---|---|---|---|---|---|---|
| Exp. III | 0 | 3 | 10 | 30 | 60 | 90 | 138 |
| Control | 0.0 | 1.7 | 2.7 | 3.1 | 3.7 | 4.1 | 4.9 |
| A5 | 0.0 | 0.7 | 1.5 | 1.9 | 2.4 | 2.8 | 3.4 |
| Exp. IV | 0 | 3 | 10 | 30 | 60 | 90 | 138 |
| Control | 0.0 | 2.4 | 3.6 | 4.9 | 6.0 | 6.4 | 6.9 |
| A5 | 0.0 | 0.3 | 0.9 | 1.3 | 1.7 | 2.0 | 2.4 |
| Exp. V | 0 | 3 | 10 | 30 | 60 | 90 | 144 |
| Control | 0.0 | 1.5 | 3.1 | 5.4 | 6.9 | 7.6 | 8.5 |
| A5 | 0.0 | 0.5 | 1.0 | 1.4 | 1.7 | 2.0 | 2.6 |
| Exp. VIII | 0 | 3 | 10 | 30 | 60 | 90 | 111 |
| Control | 0.0 | 4.7 | 7.4 | 9.6 | 11.4 | 12.0 | 12.3 |
| A5 | 0.0 | 0.6 | 1.5 | 1.9 | 2.3 | 2.6 | 2.8 |
| Exp. X | 0 | 3 | 10 | 30 | 61 | 90 | 109 |
| Control | 0.0 | 1.4 | 1.7 | 2.2 | 2.6 | 3.0 | 3.2 |
| A5 | 0.0 | 0.7 | 1.0 | 1.2 | 1.6 | 1.8 | 2.0 |

Storage Stability

Storage stability of A5 treatments did not differ of control silages, except for experiment X that showed significant temperature increase about 2° C. and tendency for 5° C. rise in control silages in comparison with A5 silages (see table 20).

TABLE 20

Storage stability of silages from intermediate or easy ensilable forages with low DM content expressed in increase of temperature.

| Treatment | Time (days) until temperature in aerated silages, in relation to ambient temperature, increase above | |
|---|---|---|
| | 2° C. | 5° C. |
| Experiment III. Ambient temp.: 20.6° C. | | |
| Control | 6.4 | 6.4 |
| A5 | 6.4 | 6.4 |
| Experiment IV. Ambient temp.: 20.6° C. | | |
| Control | 6.4 | 6.4 |
| A5 | 6.4 | 6.4 |
| Experiment V. Ambient temp.: 20.5° C. | | |
| Control | 4.9 | 4.9 |
| A5 | 4.9 | 4.9 |
| Experiment VIII. Ambient temp.: 20.4° C. | | |
| Control | 6.6 | 6.6 |
| A5 | 6.3 | 6.6 |
| Experiment X. Ambient temp.: 19.9° C. | | |
| Control | 2.6 | 3.4 |
| A5 | 5.9 | 6.1 |

Silages from Intermediate or Easy Ensilable Forages with High DM Content (WR1c, Tables 21-23)

The qualitative parameters of control and A5 treated silages are illustrated in table 21. Ethanol and ammonia-N concentrations were lower in all A5 treatments in comparison with controls. Additionally, reduction of yeast growth by A5 application was obtained in studies VI and VII.

TABLE 21

Chemical and microbiological compositions of silages from intermediate or easy ensilable forages with high DM content.

| Treatment | DM % | pH | $NH_3$—N* % of TN** | Propionic acid | Lactic acid | Acetic acid | Butyric acid | 2,3-butanediol | Ethanol | Lactate yeasts log CFU/g FM*** |
|---|---|---|---|---|---|---|---|---|---|---|
| | | | | | | % of DM | | | | |
| Experiment VI. | | | | | | | | | | |
| Control | 46.0 | 5.1 | 4.5 | <0.2 | 2.0 | 0.7 | <0.1 | <0.2 | 1.2 | 5.6 |
| A5 | 47.0 | 5.2 | 1.8 | <0.2 | 1.8 | 0.6 | <0.1 | <0.2 | 0.6 | <1.7 |
| Experiment VII. | | | | | | | | | | |
| Control | 40.9 | 5.2 | 4.3 | <0.2 | 1.2 | 0.3 | <0.1 | <0.2 | 1.1 | 5.6 |
| A5 | 40.0 | 5.0 | 1.8 | <0.2 | 1.4 | 0.3 | <0.1 | <0.2 | 0.5 | <1.7 |
| Experiment XI. | | | | | | | | | | |
| Control | 43.6 | 5.0 | 5.1 | <0.2 | 2.0 | 0.7 | <0.1 | <0.2 | 0.7 | <1.7 |
| A5 | 43.8 | 5.1 | 2.0 | <0.2 | 1.9 | 0.6 | <0.1 | <0.2 | 0.5 | <1.7 |
| Experiment XII. | | | | | | | | | | |
| Control | 38.6 | 3.9 | 9.3 | <0.1 | 5.4 | 1.5 | <0.1 | <0.1 | 0.6 | 1.7 |
| A5 | 39.2 | 3.9 | 4.0 | <0.1 | 5.5 | 1.2 | <0.1 | <0.1 | 0.4 | <1.7 |

*The value is corrected for N added with the additive in form of $NaNO_2$.
**total nitrogen
***fresh material Weight Loss Treatment with A5 significantly reduced weight losses during the whole ensiling period (see table 22).

TABLE 22

Weight losses of silages from intermediate or easy ensilable forages with high DM content during the storage period.

| Treatment | Weight losses (% of DM weight) at day | | | | | | |
|---|---|---|---|---|---|---|---|
| Exp. VI | 0 | 3 | 10 | 30 | 60 | 90 | 144 |
| Control | 0.0 | 0.6 | 1.0 | 1.5 | 1.8 | 2.2 | 2.7 |
| A5 | 0.0 | 0.4 | 0.5 | 0.9 | 1.2 | 1.4 | 1.8 |
| Exp. VII | 0 | 3 | 10 | 30 | 60 | 90 | 151 |
| Control | 0.0 | 0.5 | 0.7 | 0.9 | 1.1 | 1.4 | 1.9 |
| A5 | 0.0 | 0.3 | 0.3 | 0.5 | 0.7 | 0.9 | 1.2 |
| Exp. XI | 0 | 3 | 10 | 30 | 60 | 90 | 116 |
| Control | 0.0 | 0.4 | 0.7 | 1.0 | 1.4 | 1.6 | 1.8 |
| A5 | 0.0 | 0.2 | 0.4 | 0.7 | 1.0 | 1.3 | 1.4 |
| Exp. XII | 0 | 3 | 9 | 29 | 63 | 98 | |
| Control | 0.0 | 0.7 | 0.8 | 1.0 | 1.3 | 1.5 | |
| A5 | 0.0 | 0.5 | 0.6 | 0.8 | 1.0 | 1.2 | |

Storage Stability

Studies VI and VII showed a much slower temperature increase in silages using A5 compared to control silages (see table 23).

TABLE 23

Storage stability of silages from intermediate or easy ensilable forages with high DM content expressed in increase of temperature.

| Treatment | Time (days) until temperature in aerated silages, in relation to ambient temperature, increase above | |
|---|---|---|
| | 2° C. | 5° C. |
| Experiment VI. Ambient temp.: 20.5° C. | | |
| Control | 0.3 | 0.6 |
| A5 | 4.9 | 4.9 |
| Experiment VII. Ambient temp.: 20.4° C. | | |
| Control | 1.0 | 1.3 |
| A5 | 6.6 | 6.6 |
| Experiment XI. Ambient temp.: 20.2° C. | | |
| Control | 6.8 | 6.8 |
| A5 | 6.8 | 6.8 |
| Experiment XII. Ambient temp.: 19.9° C. | | |
| Control | 5.6 | 6.8 |
| A5 | 6.8 | 6.8 |

Silages from Aerobic Stability Study

The chemical and microbiological composition, and aerobic stability measurement of silages from the experiment (XIII) for aerobic stability approval is listed in table 24. Silages treated with additive A5 were found to have significantly lower ammonia-N concentration compared to untreated control silages. Microbiological analyses revealed considerable reduction of yeasts in A5 treated silages, which was followed by significantly extension of aerobic stability of these silages.

TABLE 24

Chemical and microbiological compositions of silages, and their storage stability expressed in increase of temperature.

| Analyses | | Control | A5 |
|---|---|---|---|
| DM | % | 34.9 | 34.3 |
| pH | | 3.9 | 3.9 |
| $NH_3$—N* | % of TN** | 8.4 | 2.9 |
| Propionic acid | % of DM | 0.1 | 0.1 |
| Lactic acid | % of DM | 5.1 | 5.2 |
| Acetic acid | % of DM | 1.6 | 1.3 |
| Butyric acid | % of DM | 0.1 | 0.1 |
| 2,3-butanediol | % of DM | 0.1 | 0.1 |
| Ethanol | % of DM | 0.5 | 0.3 |
| Lactate yeast | log CFU/g FM*** | 5.7 | 0.0 |
| Temp increase by 2° C.**** | days | 0.7 | 6.4 |
| Temp increase by 5° C.***** | days | 1.0 | 6.4 |

*The value is corrected for N added with the additive in form of $NaNO_2$
**Total nitrogen
***Fresh material
****Time until temperature in aerated silages, in relation to ambient temperature, increase above 2° C.
*****Time until temperature in aerated silages, in relation to ambient temperature, increase above 5° C.

Weight Loss

A5 treatment significantly reduced weight losses during the whole ensiling period (see table 25).

TABLE 25

Weight losses of silages from aerobic stability study.

| Treatment | Weight losses (% of DM weight) at day | | | | |
|---|---|---|---|---|---|
| Exp. XIII | 0 | 3 | 9 | 29 | 48 |
| Control | 0.0 | 1.1 | 1.2 | 1.8 | 2.1 |
| A5 | 0.0 | 0.5 | 0.6 | 1.1 | 1.4 |

Test of Different Dosages of A5 in Silage Making

Forages from studies X and XI were used in experiments with dosages at low DM level and high DM level. The same procedure of forage preparation, additive application, sampling, and silo filling as described above was used. Table 26 gives a list of treatments and application rates. There were two replicates per treatment. Silages were stored for 90 days and analyzed according to previous studies.

TABLE 26

List of treatments and their application rates at both DM levels.

| Treatment | Application rate (liter/ton FM*) |
|---|---|
| Control | |
| A5-2L | 2 |
| A5-3L | 3 |
| A5-4L | 4 |
| A5-5L | 5 |

*fresh material

In general, all silages in both experiments were well fermented and differences in chemical parameters between treatments were numerically small. Further, the storage stability was good.

Discussion

Untreated control silages in experiments with difficult ensilable crops were found with all the features typical for clostridial fermentation, which was not unexpected.

Silages treated with A5 showed a fermentation process accomplished by lactic acid bacteria demonstrated by a low pH and a high concentration of lactic acid. The fermentation pattern of A5 treated silages was also reflected in reduction of silage losses.

Use of crops mainly consisting of grasses, which generally posses high concentrations of WSC and low buffering capacity (BC) giving high fermentation coefficient (FC), was not sufficient to eliminate the clostridial growth, which is demonstrated in control silages in four of five experiments.

Silgaes treated with additive A5, unlike untreated silages, were well fermented without any clostridial activity.

The present series of experiments clearly showed high risk of Clostridia proliferation in silages without addition of additives and with DM less than 30%.

Further, the present series of experiments also showed that additive A5 considerably restricted the growth of yeasts in silages, which resulted in that the silages were aerobically stable during the whole examination time.

The invention claimed is:

1. An ensiling agent for forage, said ensiling agent comprising:
    sodium nitrite, sodium benzoate and potassium sorbate, and
    an aqueous solvent,
    wherein the sodium nitrite is present in an amount from 1 to 10% by weight, the sodium benzoate is present in an amount of 5 to 50% by weight, and the potassium sorbate is present in an amount from 5 to 35% by weight, based on a total weight of the ensiling agent.

2. The ensiling agent according to claim 1, further comprising at least one additional component which is selected from the group consisting of propionic acid, formic acid or any salt thereof or any mixture thereof.

3. The ensiling agent according to claim 1, wherein the sodium nitrite is present in an amount from 2 to 8% by weight.

4. The ensiling agent according to claim 3, wherein the sodium nitrite is present in an amount of about 5% by weight.

5. The ensiling agent according to claim 1, wherein the sodium benzoate is present in an amount 10 to 30% by weight.

6. The ensiling agent according to claim 5, wherein the sodium benzoate is present in an amount of about 20% by weight.

7. The ensiling agent according to claim 1, wherein the potassium sorbate is present in an amount from 5 to 25% by weight.

8. The ensiling agent according to claim 7, wherein the potassium sorbate is present in an amount of about 10% by weight.

9. The ensiling agent according to claim 1, wherein the sodium nitrite is present in an amount of about 5% by weight, the sodium benzoate is present in an amount of about 20% by weight and the potassium sorbate is present in an amount of about 10% by weight.

10. The ensiling agent according to claim 1, wherein said forage is selected from clover, grass, lucerne, cereals, maize or any combination or mixture thereof.

11. A method for ensiling forage, comprising:
    adding the ensiling agent according to claim 1 to said forage to be ensiled or to silage during ensilage.

12. The method according to claim 11, wherein the ensiling agent is added to said forage before sealing the ensilage process.

13. The method according to claim 11, wherein from 1 to 20 liters of the ensiling agent is added per ton of said forage.

14. The method according to claim 13, wherein about 5 liters of the ensiling agent is added per ton of said forage.

15. The method according to claim 11, wherein said forage is selected from clover, grass, lucerne, cereals, maize or any combination or mixture thereof.

16. The ensiling agent according to claim 1, wherein the sodium nitrite is present in an amount from 3 to 7% by weight.

17. The ensiling agent according to claim 1, wherein the sodium nitrite is present in an amount from 4 to 6% by weight.

18. The ensiling agent according to claim 1, wherein the sodium benzoate is present in an amount from 15 to 25% by weight.

19. The ensiling agent according to claim 1, wherein the sodium benzoate is present in an amount from 18 to 22% by weight.

20. The ensiling agent according to claim 1, wherein the potassium sorbate is present in an amount from 7 to 15% by weight.

21. The ensiling agent according to claim 1, wherein the potassium sorbate is present in an amount from 8 to 12% by weight.

22. The method according to claim 11, wherein from 1 to 10 liters of the ensiling agent is added per ton of said forage.

23. The method according to claim 11, wherein from 2 to 8 liters of the ensiling agent is added per ton of said forage.

24. The method according to claim 11, wherein from 3 to 7 liters of the ensiling agent is added per ton of said forage.

* * * * *